US011514610B2

(12) United States Patent
Gao et al.

(10) Patent No.: US 11,514,610 B2
(45) Date of Patent: Nov. 29, 2022

(54) METHOD AND APPARATUS FOR POINT CLOUD CODING

(71) Applicant: TENCENT AMERICA LLC, Palo Alto, CA (US)

(72) Inventors: Wen Gao, West Windsor, NJ (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 13 days.

(21) Appl. No.: 16/983,586

(22) Filed: Aug. 3, 2020

(65) Prior Publication Data
US 2021/0049790 A1    Feb. 18, 2021

Related U.S. Application Data

(60) Provisional application No. 62/886,813, filed on Aug. 14, 2019.

(51) Int. Cl.
*G06T 9/00*    (2006.01)
(52) U.S. Cl.
CPC .................... *G06T 9/00* (2013.01)
(58) Field of Classification Search
CPC ....................................................... G06T 9/00
USPC ....................................................... 382/232
See application file for complete search history.

(56) References Cited

U.S. PATENT DOCUMENTS

| | | | | |
|---|---|---|---|---|
| 2009/0027412 | A1* | 1/2009 | Burley | G06T 15/04 345/582 |
| 2016/0009410 | A1* | 1/2016 | Derenick | G08G 5/025 701/17 |
| 2019/0258225 | A1* | 8/2019 | Link | G05B 19/4097 |
| 2020/0249050 | A1* | 8/2020 | Kato | G01C 21/3833 |

OTHER PUBLICATIONS

"Call for Proposals for Point Cloud Compression V2," N16763, International Organization for Standardization, Hobart, AU, Apr. 2017 (21 pages).

* cited by examiner

*Primary Examiner* — Wednel Cadeau
(74) *Attorney, Agent, or Firm* — ArentFox Schiff LLP

(57) ABSTRACT

Aspects of the disclosure provide methods, apparatuses, and a non-transitory computer-readable medium for point cloud compression and decompression. In some examples, an apparatus for point cloud compression/decompression includes processing circuitry. The processing circuitry determines, for each point in a first point cloud, a corresponding point in a second point cloud. The first point cloud is a processed point cloud based on the second point cloud. The processing circuitry determines, for each point in the first point cloud, a corresponding error vector based on the corresponding point in the second point cloud. The processing circuitry determines, for each point in the first point cloud, a corresponding weight factor based on a position of the respective point in the first point cloud. The processing circuitry determines a quality metric for the first point cloud based on the error vectors and the weight factors.

20 Claims, 11 Drawing Sheets

METHOD AND APPARATUS FOR POINT CLOUD CODING

INCORPORATION BY REFERENCE

This present application claims the benefit of priority to U.S. Provisional Application No. 62/886,813, "QUALITY METRIC FOR POINT CLOUD USED IN AUTONOMOUS DRIVING VEHICLES" filed on Aug. 14, 2019, which is incorporated by reference herein in its entirety.

TECHNICAL FIELD

The present disclosure describes embodiments generally related to point cloud coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. Point clouds can be used as a 3D representation of the world. A point cloud is a set of points in a 3D space, each with associated attributes, e.g. color, material properties, texture information, intensity attributes, reflectivity attributes, motion related attributes, modality attributes, and various other attributes. Such point clouds may include large amounts of data and may be costly and time-consuming to store and transmit.

SUMMARY

Aspects of the disclosure provide apparatuses for point cloud compression and decompression. In some examples, an apparatus for point cloud compression/decompression includes processing circuitry. The processing circuitry determines, for each point in a first point cloud, a corresponding point in a second point cloud. The first point cloud is a processed point cloud based on the second point cloud. The processing circuitry determines, for each point in the first point cloud, a corresponding error vector based on the corresponding point in the second point cloud. The processing circuitry determines, for each point in the first point cloud, a corresponding weight factor based on a position of the respective point in the first point cloud. The processing circuitry determines a quality metric for the first point cloud based on the error vectors and the weight factors.

According to aspects of the disclosure, the processing circuitry determines, for each point in the first point cloud, the corresponding weight factor based on a velocity vector and the position of the respective point in the first point cloud.

In an embodiment, the processing circuitry determines, for each point in the first point cloud, the corresponding weight factor of the respective point in the first point cloud as zero based on a norm value of the position of the respective point in the first point cloud being (i) less than a first threshold or (ii) greater than a second threshold.

In an embodiment, the processing circuitry determines, for each point in the first point cloud, the corresponding weight factor of the respective point in the first point cloud as a positive constant based on a norm value of the position of the respective point in the first point cloud being (i) equal to or greater than a first threshold and (ii) equal to or less than a second threshold.

In an embodiment, norm values of positions of a subset of the points in the first point cloud are (i) equal to or greater than a first threshold and (ii) equal to or less than a second threshold, and the corresponding weight factors of the subset of the points in the first point cloud are inversely related to the norm values of the positions of the subset of the points in the first point cloud.

In an embodiment, norm values of positions of a subset of the points in the first point cloud are (i) equal to or greater than a first threshold and (ii) equal to or less than a second threshold, and the corresponding weight factors of the subset of the points in the first point cloud are positively related to a norm value of the velocity vector.

In an embodiment, norm values of positions of a subset of the points in the first point cloud are (i) equal to or greater than a first threshold and (ii) equal to or less than a second threshold, and the corresponding weight factors of the subset of the points in the first point cloud are determined based on a comparison between a norm value of the velocity vector and a third threshold.

In an embodiment, norm values of positions of a subset of the points in the first point cloud are (i) equal to or greater than a first threshold and (ii) equal to or less than a second threshold, and the corresponding weight factors of the subset of the points in the first point cloud are positively related to a norm value of the velocity vector in one direction.

In an embodiment, norm values of positions of a subset of the points in the first point cloud are (i) equal to or greater than a first threshold and (ii) equal to or less than a second threshold, and the corresponding weight factors of the subset of the points in the first point cloud are determined based on a comparison between a norm value of the velocity vector in one direction and a fourth threshold.

In an embodiment, both the first point cloud and the second point cloud use a same coordinate system, and the processing circuitry determines, for each point in the first point cloud, the corresponding point in the second point cloud to be a point in the second point cloud that is nearest to the respective point in the first point cloud.

Aspects of the disclosure provide methods for point cloud compression and decompression. In a method, for each point in a first point cloud, a corresponding point in a second point cloud is determined. The first point cloud is a processed point cloud based on the second point cloud. For each point in the first point cloud, a corresponding error vector is determined based on the corresponding point in the second point cloud. For each point in the first point cloud, a corresponding weight factor is determined based on a position of the respective point in the first point cloud. A quality metric for the first point cloud is determined based on the error vectors and the weight factors.

Aspects of the disclosure also provide a non-transitory computer-readable medium storing instructions which when executed by a computer for point cloud encoding/decoding cause the computer to perform any one or a combination of the methods for point cloud encoding/decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Point Cloud Encoder and Decoder

Aspects of the disclosure provide point cloud coding (PCC) techniques. PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much commonality with video coding, and the V-PCC is heavily based on video coding. For example, V-PCC can map a point of the 3D cloud to a pixel of a 2D grid (an image). The V-PCC scheme can utilize generic video codecs for point cloud compression. Moving picture experts group (MPEG) is working on a G-PCC standard and a V-PCC standard that respectively use the G-PCC scheme and the V-PCC scheme.

Hereinafter, a point cloud generally may refer to a set of points in a 3D space, each with associated attributes, e.g. color, material properties, texture information, intensity attributes, reflectivity attributes, motion related attributes, modality attributes, and various other attributes. Point clouds can be used to reconstruct an object or a scene as a composition of such points. The points can be captured using multiple cameras and depth sensors in various setups and may be made up of thousands up to billions of points in order to realistically represent reconstructed scenes. A patch generally may refer to a contiguous subset of the surface described by the point cloud. In an example, a patch includes points with surface normal vectors that deviate from one another less than a threshold amount.

Compression technologies are needed to reduce the amount of data required to represent a point cloud. As such, technologies are needed for lossy compression of point clouds for use in real-time communications and six Degrees of Freedom (6 DoF) virtual reality. In addition, technology is sought for lossless point cloud compression in the context of dynamic mapping for autonomous driving and cultural heritage applications, and the like.

V-PCC can be used to leverage existing video codecs to compress the geometry, occupancy, and texture of a dynamic point cloud as three separate video sequences. The extra metadata needed to interpret the three video sequences are compressed separately. A small portion of the overall bitstream is the metadata, which could be encoded/decoded efficiently using a software implementation. The bulk of the information is handled by the video codec.

Figure 1:
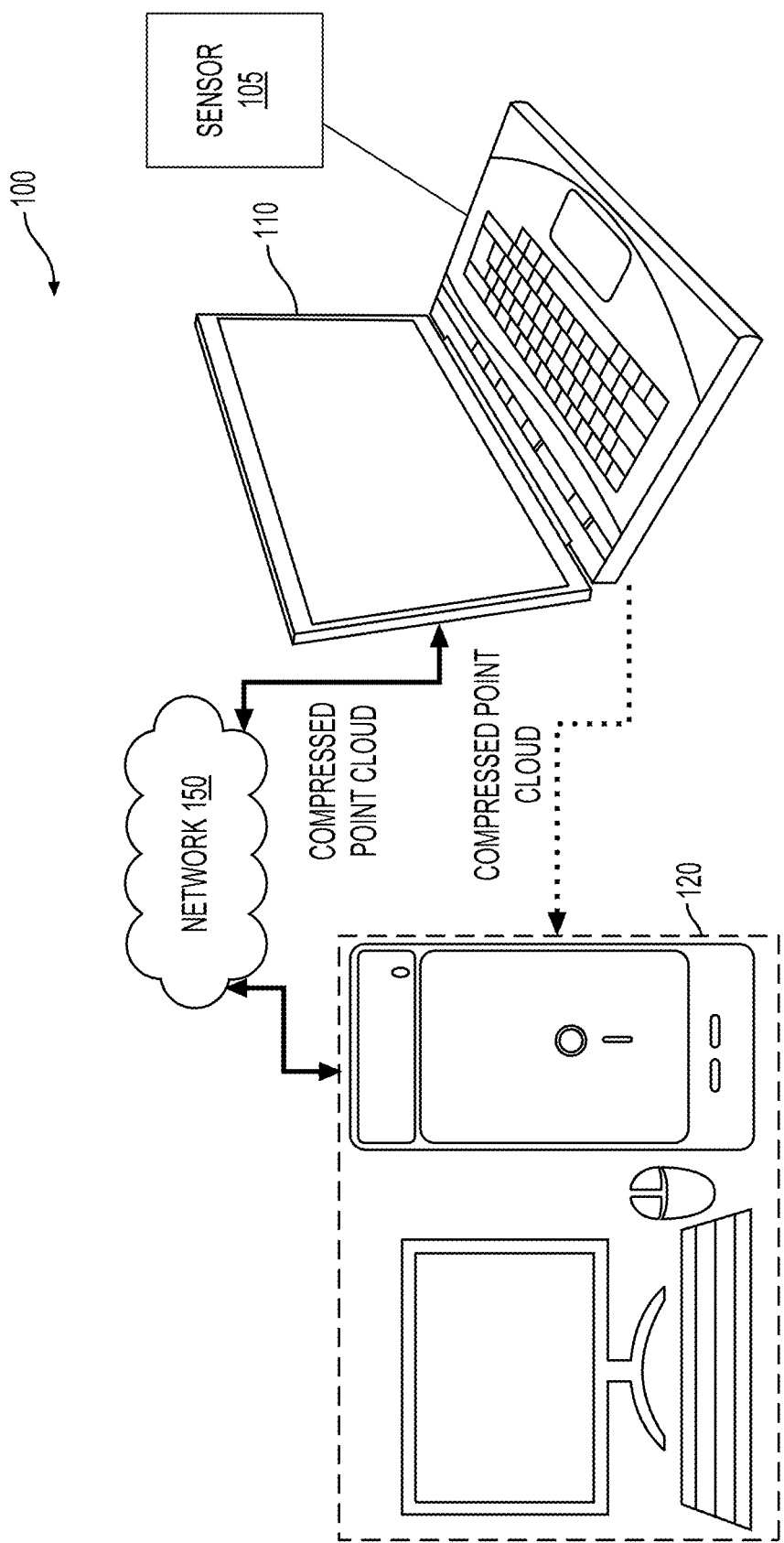
FIG. 1 is a schematic illustration of a simplified block diagram of a communication system in accordance with an embodiment.

FIG. 1 illustrates a simplified block diagram of a communication system (100) according to an embodiment of the present disclosure. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor 105 connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number or type of networks that can transmit compressed point cloud data between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, and/or the Internet. The specific architecture and topology of the network (150) is not limited in the present disclosure unless explained herein below.

Figure 2:
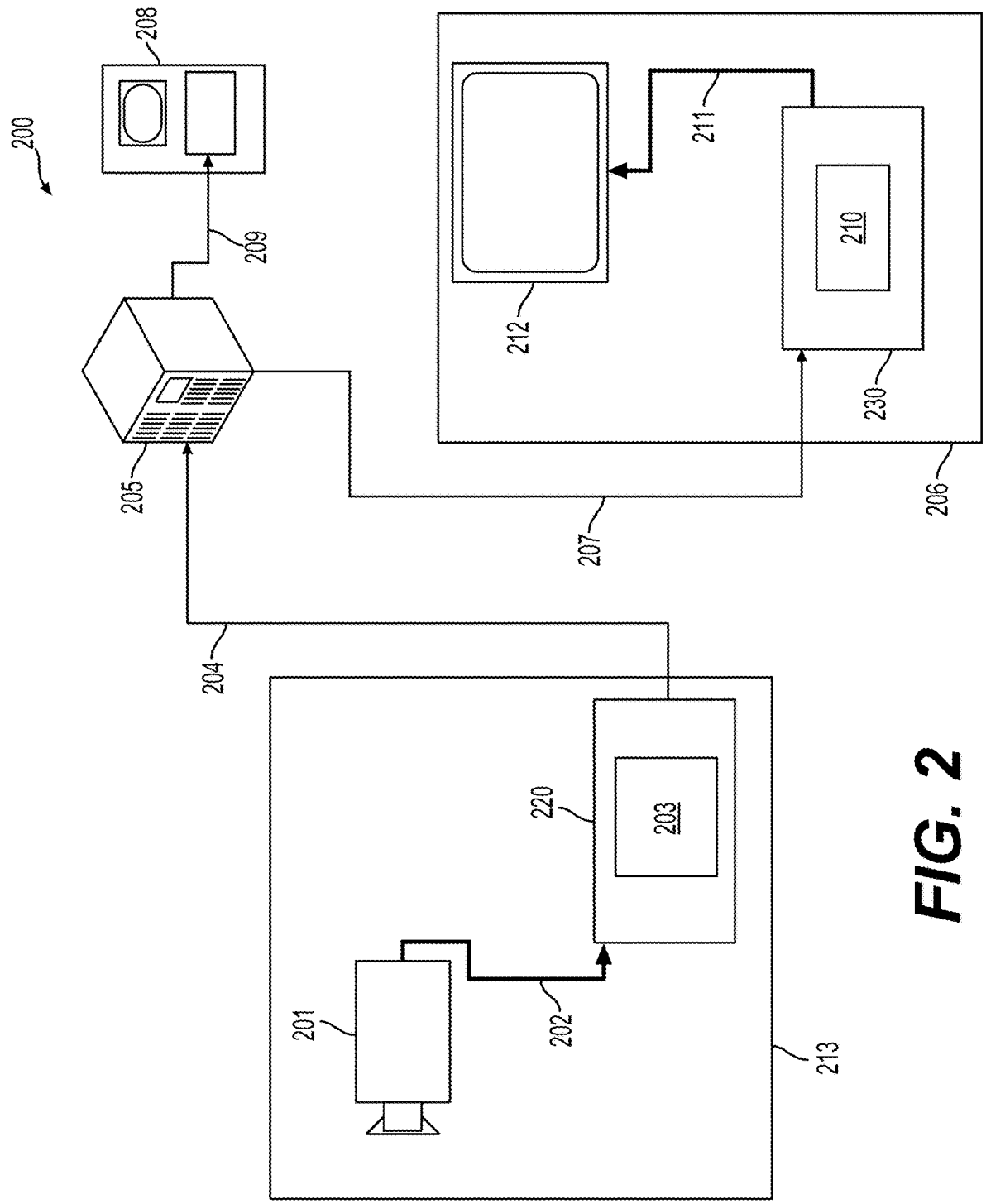
FIG. 2 is a schematic illustration of a simplified block diagram of a streaming system in accordance with an embodiment.

FIG. 2 illustrates a simplified block diagram of a streaming system (200) in accordance with an embodiment. The FIG. 2 example is an application for the disclosed subject matter for a point cloud. The disclosed subject matter can be equally applicable to other point cloud enabled applications, such as, a 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
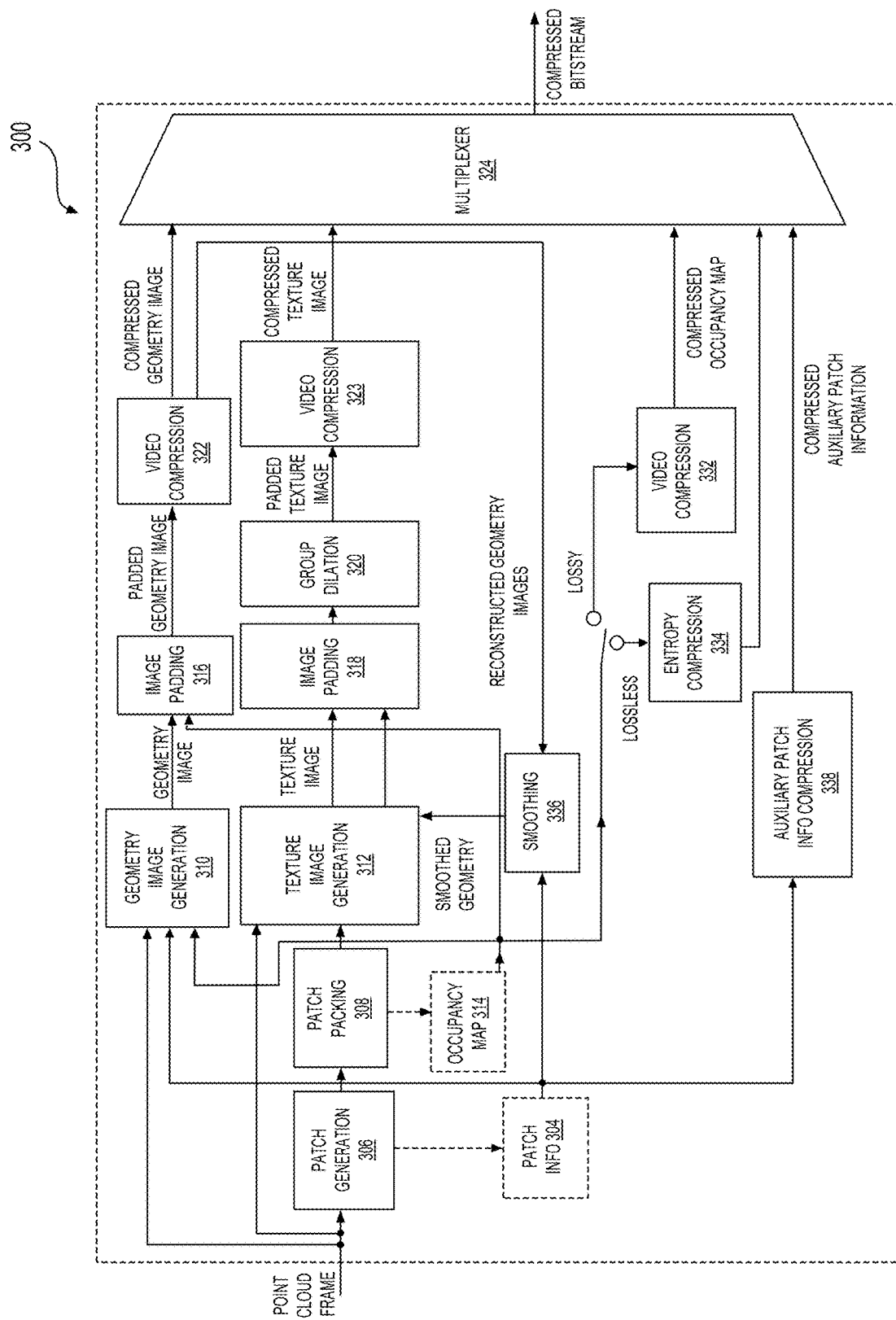
FIG. 3 shows a block diagram of an encoder for encoding point cloud frames, according to some embodiments.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured to and operate in a similar manner as the V-PCC encoder (300).

The V-PCC encoder (300) receives point cloud frames as uncompressed inputs and generates a bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into an image-based representation along with some meta data (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate whether the pixels are occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims to decompose the point cloud into a minimum number of patches with smooth boundaries, while also minimizing reconstruction error.

The patch info module (304) can collect the patch information that indicates sizes and shapes of the patches. In some examples, the patch information can be packed into an image frame and then encoded by the auxiliary patch info compression module (338) to generate the compressed auxiliary patch information.

The patch packing module (308) is configured to map the extracted patches onto a 2 dimensional (2D) grid while minimizing unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with a geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch can be projected onto two images, referred to as layers. In an example, a geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to an empty space or to a point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate and does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation module (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, and the compressed auxiliary patch information into a compressed bitstream.

Figure 4:
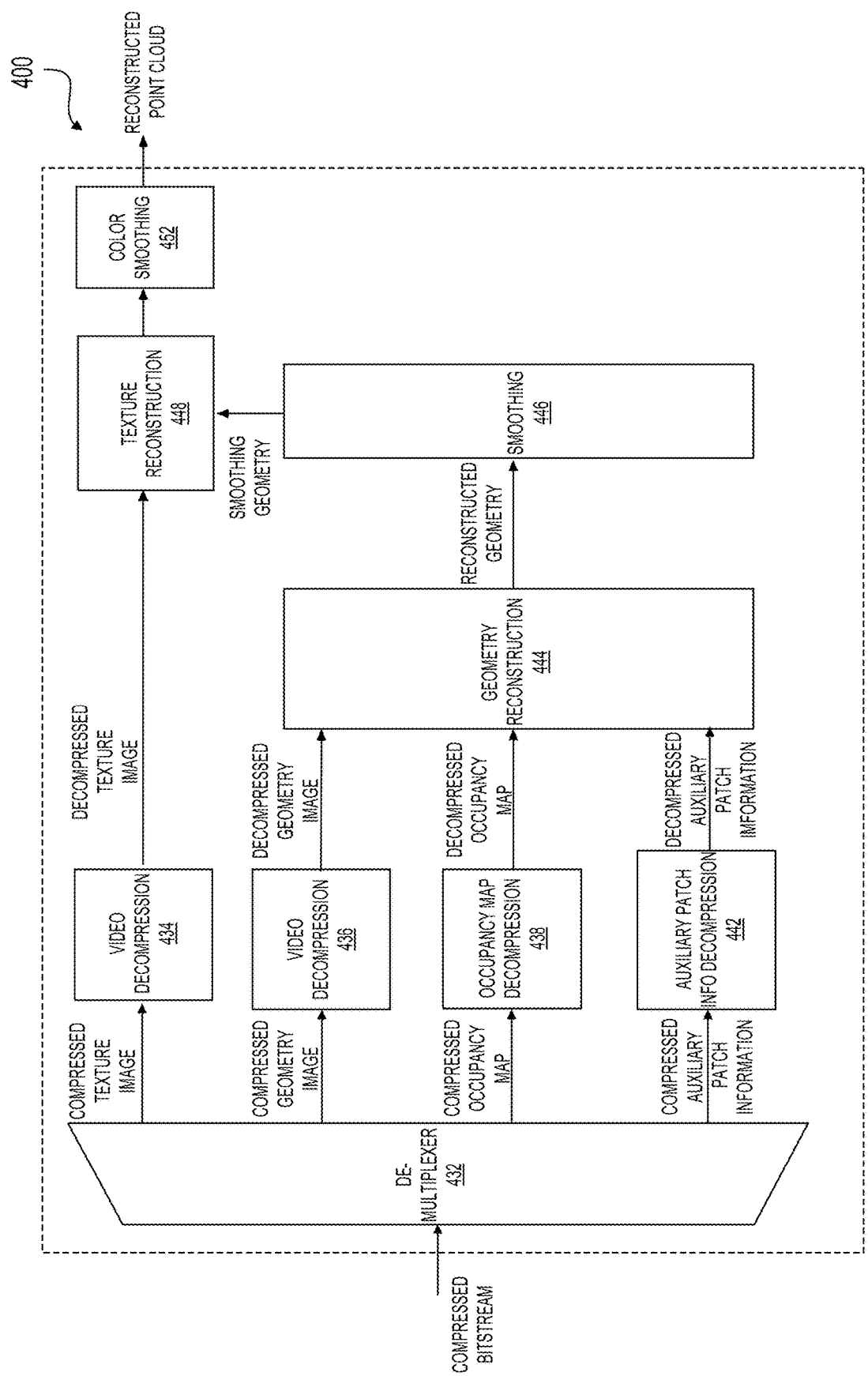
FIG. 4 shows a block diagram of a decoder for decoding a compressed bitstream corresponding to point cloud frames according to some embodiments.

FIG. 4 shows a block diagram of a V-PCC decoder (400) for decoding compressed bitstream corresponding to point cloud frames, according to some embodiments. In some embodiments, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates a reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into a compressed texture image, a compressed geometry image, a compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate a reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
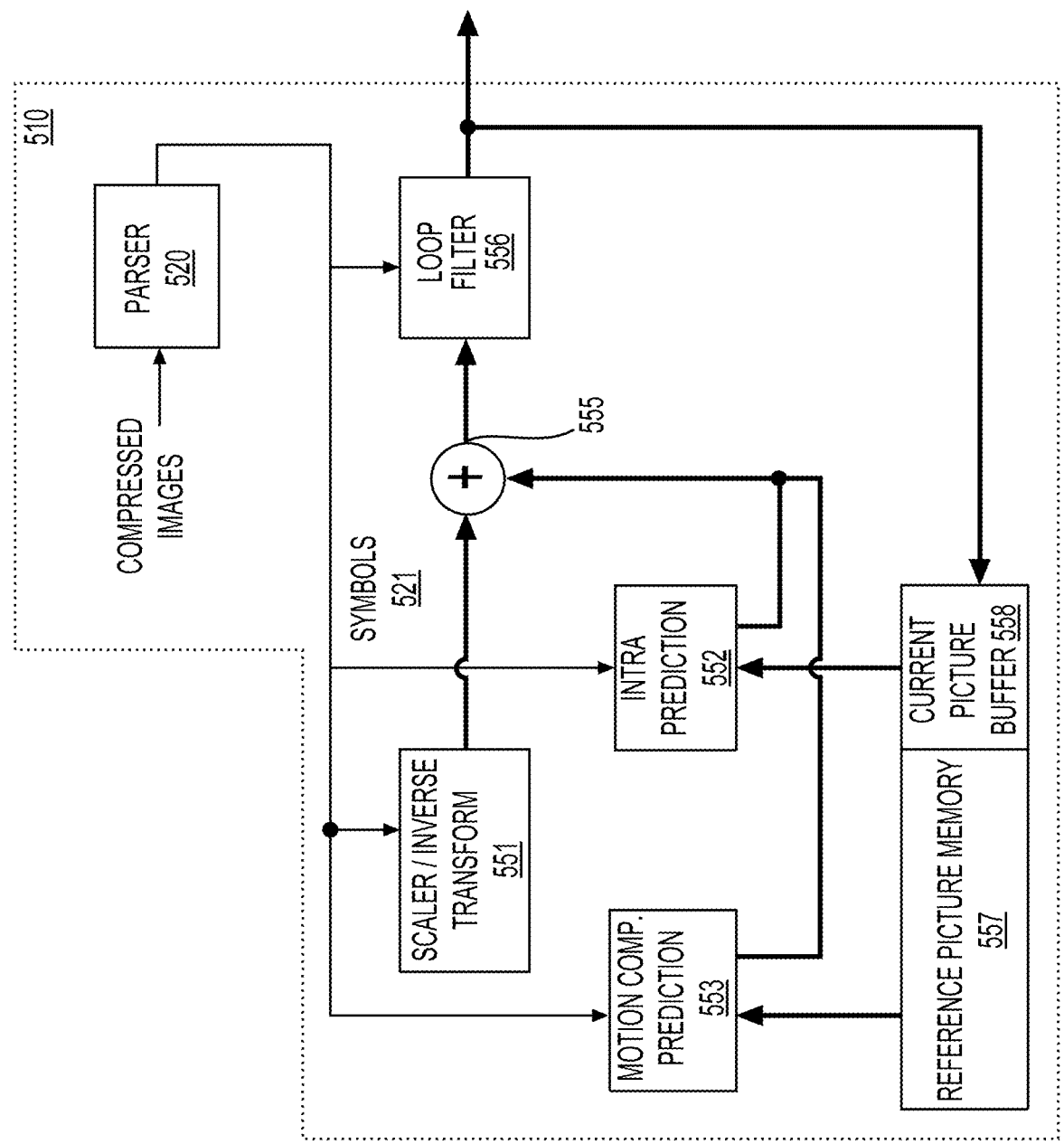
FIG. 5 is a schematic illustration of a simplified block diagram of a video decoder in accordance with an embodiment.

FIG. 5 shows a block diagram of a video decoder (510) according to an embodiment of the present disclosure. The video decoder (510) can be used in the V-PCC decoder (400). For example, the video decompression modules (434) and (436), and the occupancy map decompression module (438), can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (e.g., inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape as the block under reconstruction, using surrounding already reconstructed information fetched from the current picture buffer (558). The current picture buffer (558) buffers, for example, a partly reconstructed current picture and/or a fully reconstructed current picture. The aggregator (555), in some cases, adds, on a per sample basis, the prediction information generated by the intra prediction unit (552) to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access a reference picture memory (557) to fetch samples used for prediction. After performing motion compensation on the fetched samples in accordance with the symbols (521) pertaining to the block, these samples can be added by the aggregator (555) to the output of the scaler/inverse transform unit (551) (in this case called residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a rendering device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (e.g., by the parser (520)), the current picture buffer (558) can become a part of the reference picture memory (557), and another (or new) current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (e.g., measured in megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
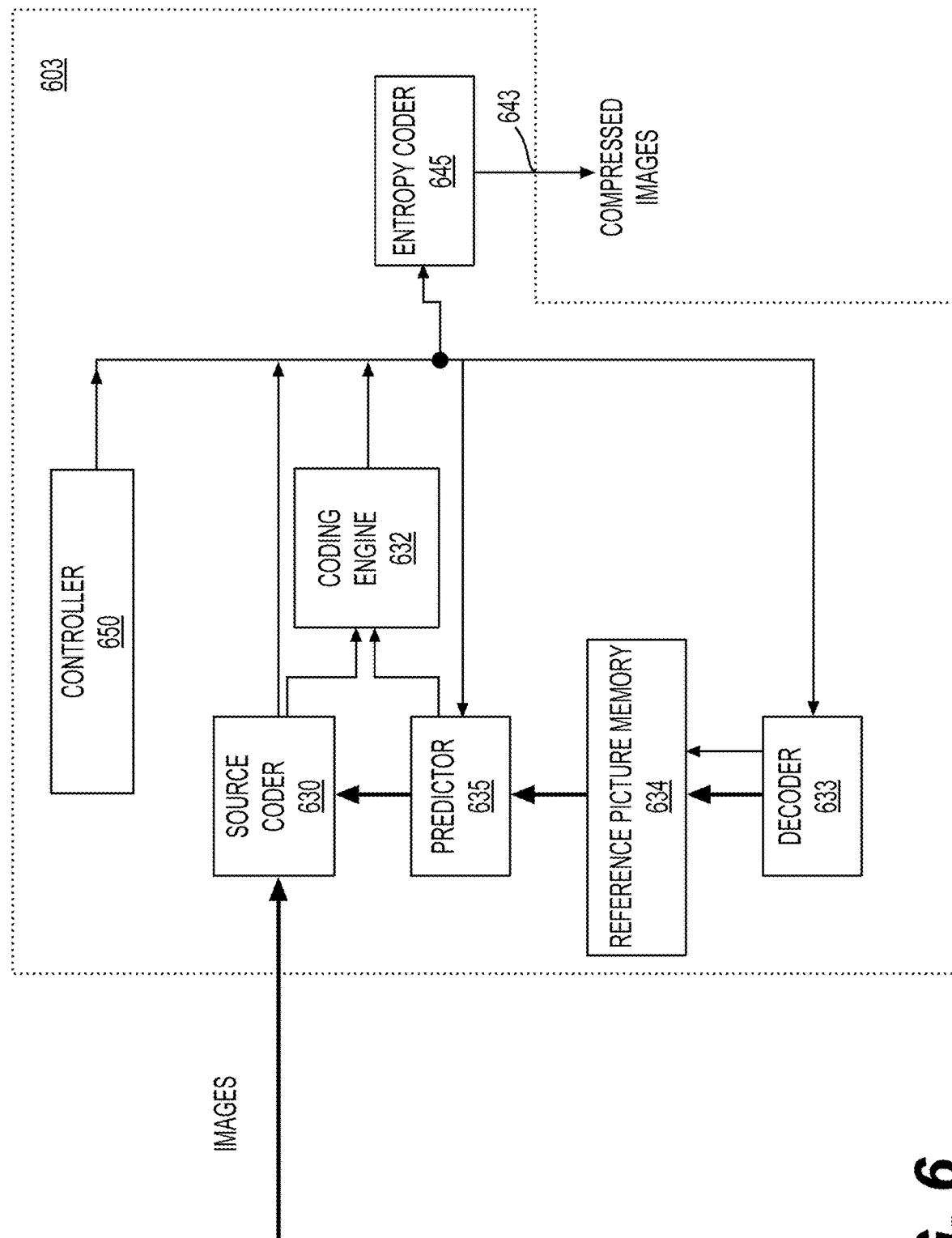
FIG. 6 is a schematic illustration of a simplified block diagram of a video encoder in accordance with an embodiment.

FIG. 6 shows a block diagram of a video encoder (603) according to an embodiment of the present disclosure. The video encoder (603) can be used in the V-PCC encoder (300) to compress point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (e.g., picture skip, quantizer, lambda value of rate-distortion optimization techniques, etc.), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (e.g., sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as that of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on the decoder operation as an example. The description of encoder technologies can be abbreviated as they are the inverse of the comprehensively described decoder technologies. Only in certain areas a more detailed description is required and provided below.

During operation, in some examples, the source coder (630) may perform motion compensated predictive coding, which codes an input picture predictively with reference to one or more previously-coded pictures from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block by pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (e.g., blocks of 4×4, 8×8, 4×8, or 16×16 samples each) and coded on a block by block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (e.g., spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in units of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple CUs. For example, a CTU of 64×64 pixels can be split into one CU of 64×64 pixels, 4 CUs of 32×32 pixels, or 16 CUs of 16×16 pixels. In an example, each CU is analyzed to determine a prediction type for the CU, such as an inter prediction type or an intra prediction type. The CU is split into one or more PUs depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
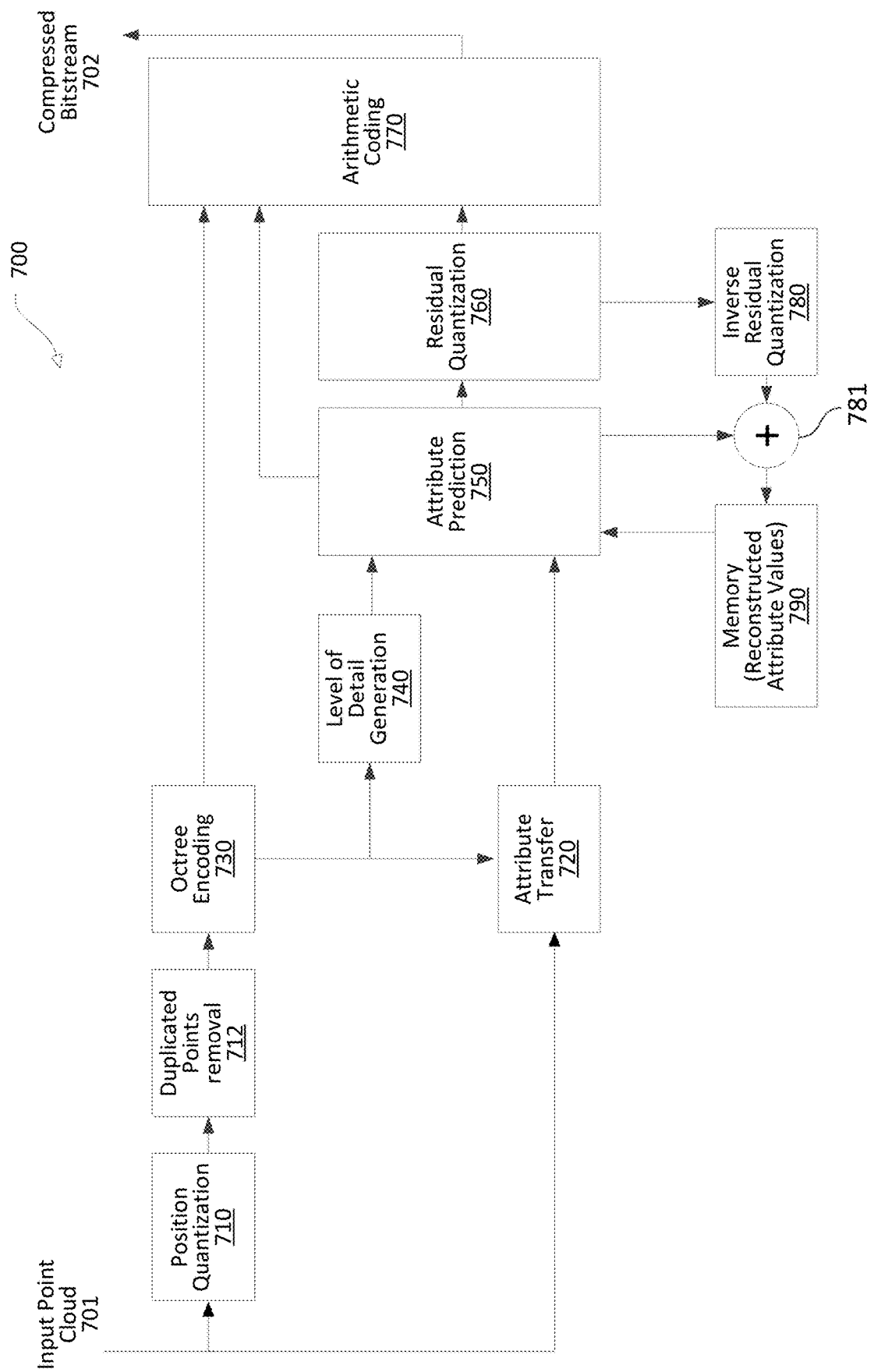
FIG. 7 shows a block diagram of an encoder for encoding point cloud frames, according to some embodiments.

FIG. 7 shows a block diagram of a G-PPC encoder (700) in accordance with an embodiment. The encoder (700) can be configured to receive point cloud data and compress the point cloud data to generate a bit stream carrying compressed point cloud data. In an embodiment, the encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quan-tization module (780), an addition module (781), and a memory (790) to store reconstructed attribute values.

As shown, an input point cloud (701) can be received at the encoder (700). Positions (e.g., 3D coordinates) of the point cloud (701) are provided to the quantization module (310). The quantization module (710) is configured to quantize the coordinates to generate quantized positions. The optional duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
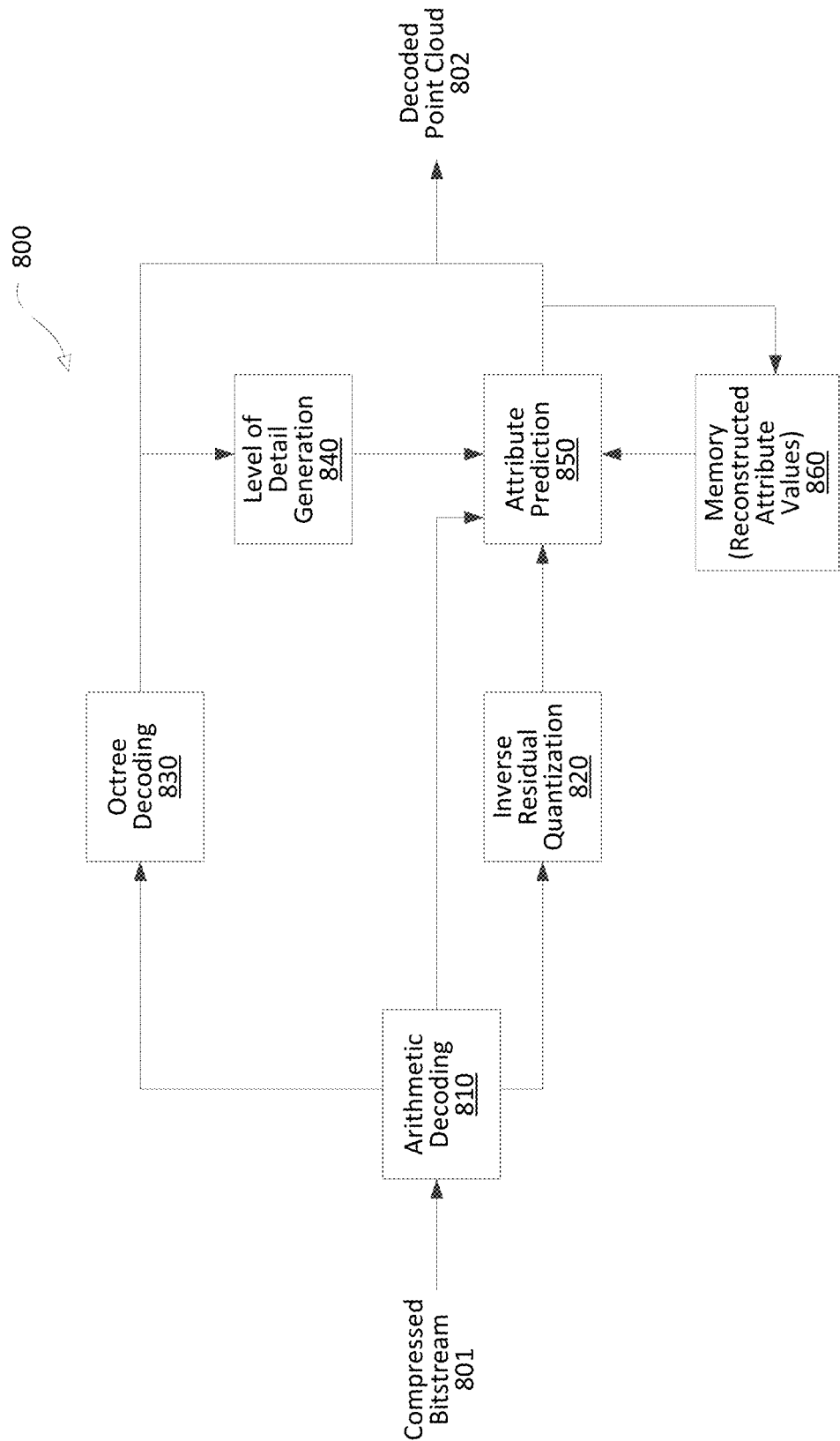
FIG. 8 shows a block diagram of a decoder for decoding a compressed bitstream corresponding to point cloud frames according to some embodiments.

FIG. 8 shows a block diagram of a G-PCC decoder (800) in accordance with an embodiment. The decoder (800) can be configured to receive a compressed bitstream and perform point cloud data decompression to decompress the bitstream to generate decoded point cloud data. In an embodiment, the decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). The attribute prediction module (850) can combine the attribute prediction with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more processors or integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (e.g., non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

II. Quality Metric for PCC

Point cloud has been widely used in for example autonomous driving vehicles for object identification, tracking, and localization. In one application, point cloud data is first captured by sensors on vehicles, processed and compressed by point cloud encoders, and then stored in cloud storage for later usage. One usage of the stored point cloud is to train algorithms for environment sensing, object identification, tracking, and localization.

Since a lossy processing including a lossy compression can introduce a distortion into an original point cloud, it is important to measure a quality metric of a processed point cloud relative to the original point cloud. A simple and meaningful quality metric is important. One such quality metric is a peak signal to noise ratio (PSNR) of a point to point error (D1), which is shown as follows:

$$PSNR = 10\log_{10}\frac{A^2}{MSE} \qquad \text{Eq. (1)}$$

where A is the peak signal level and MSE is the mean square of the point to point error between the processed point cloud and the original point cloud.

Figure 9:
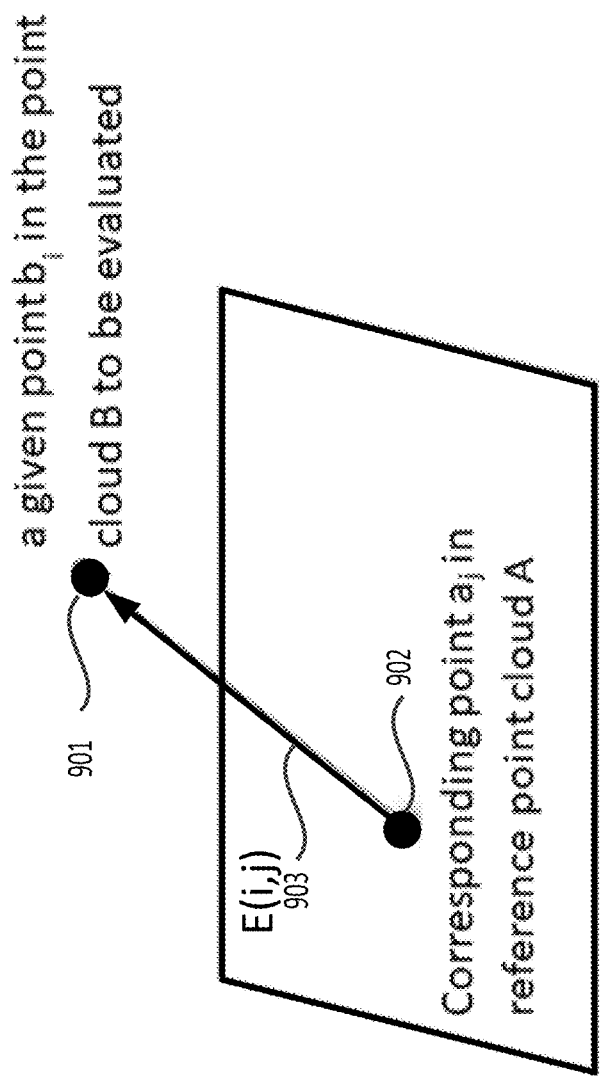
FIG. 9 shows an exemplary point to point error according to an embodiment of the disclosure.

FIG. 9 shows an exemplary point to point error according to an embodiment of the disclosure. In FIG. 9, A and B denote the original and the processed point clouds, respectively. It is assumed that points in both A and B are in a same coordinate system. The coordinate system can be local to an apparatus that generates the original point cloud, for example a Lidar sensor on a vehicle. For each point, e.g., a point $b_i$ (901) in the point cloud B, a corresponding point, e.g., a point $a_j$ (902) in the point cloud A is identified. The identified point $a_j$ (902) can be a nearest neighbor of the point $b_i$ (901) in the coordinate. An error vector E(i,j) (903) can be determined by connecting the identified point $a_j$ (902) in the original (or reference) point cloud A to the point $b_i$ (901) in the point cloud B. A length of the error vector (903) is the point-to-point error (D1), i.e., $$e_{B,A}(i) = |E(i,j)| \qquad \text{Eq. (2)}$$

Accordingly, MSE can be computed based on the point-to-point errors of the whole point cloud B, $$MSE = \frac{1}{N_B}\sum_{\forall b_i \in B} e_{B,A}^2(i) \qquad \text{Eq. (3)}$$

where $N_B$ is the number of points in the point cloud B.

It can be seen that squared point-to-point errors are averaged evenly for all points in Eq. (3), indicating that all the points in the point cloud B have the same importance. However, in some examples, such as the application of autonomous driving, points at the different distances from a vehicle can have different importance. For example, points that are very far away from the vehicle may not be as important as those that are closer or at moderate distances to the vehicle. The present disclosure presents methods for quality metrics to capture the differences in importance of different points.

III. Proposed Methods for Quality Metric

The present disclosure includes embodiments directed to quality metrics for PCC, for example as used in autonomous vehicles or other moving objects. In some embodiments, a speed of the vehicle or object can be used to generate the quality metrics.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

As noted above, the disclosure presents quality metrics that can weight point-to-point errors based on the importance of the points. In addition, the quality metric can also take into account of the impact of a vehicle speed.

The weighted mean square error can be described as follows:

$$wMSE = \frac{1}{\sum_{w(bi)} w(b_i)} \sum_{\forall b_i \in B} w(b_i) e_{B,A}^2(i) \quad \text{Eq. (4)}$$

where $w(b_i)$ is a weight factor for the point $b_i$ in the point cloud B.

In one example, $w(b_i)=1$, i.e., the equal weight case, which is exactly the same as that in Eq. (3).

In some embodiments, points in the point cloud B (e.g., used in autonomous driving) that are very close (e.g., within a certain distance) and/or very far away (e.g., beyond a certain distance) may not be reliable. Accordingly, for each point in the point cloud B, the weight factor of the respective point can be set to zero when a norm value of the position of the respective point is (i) less than a first threshold and/or (ii) greater than a second threshold. One or more additional thresholds can be used in other embodiments. When the norm value of the position of the respective point in the point cloud B is (i) equal to or greater than the first threshold and/or (ii) equal to or less than the second threshold, the weight factor of the respective point can be a positive constant. In one embodiment, the weight factor can be described as follows:

$$w(b_i) = \begin{cases} 0 & \text{if } |b_i| < d0 \\ C & \text{if } d0 \leq |b_i| \leq d1 \\ 0 & \text{if } |b_i| > d1 \end{cases} \quad \text{Eq. (5)}$$

where d0 and d1 are two thresholds and 0<d0<d1, C is a positive constant, and $|b_i|$ is a norm value of the 3D point $b_i = (b_x, b_y, b_z)$.

In some embodiments, the weight factor of the points that are close (e.g., within a certain distance) and/or at a moderate distance (e.g., within a certain distance range) can be emphasized. For example, when norm values of positions of a subset of the points in the point cloud B are (i) equal to or greater than the first threshold and/or (ii) equal to or less than the second threshold, the weight factors of the subset of the points in the point cloud B can be inversely related to the norm values of the positions of the subset of the points in the point cloud B. In one embodiment, the weight factor can be described as follows:

$$w(b_i) = \begin{cases} 0 & \text{if } |b_i| < d0 \\ \frac{1}{|b_i|^{C1} + C2} & \text{if } d0 \leq |b_i| \leq d1 \\ 0 & \text{if } |b_i| > d1 \end{cases} \quad \text{Eq. (6)}$$

where C1 is a positive constant, for example C1=1, ½, or ⅓, etc.; and C2 is another non-negative constant and used as a bias.

In some embodiments, the importance of the point is also related to the speed of the apparatus that generates the original point cloud (e.g., point cloud A). For example, in an autonomous driving system, the importance of the points can be related to the vehicle speed. If the vehicle moves fast, distant points become more important since it can be more important to identify or track distant objects to avoid a collision. Accordingly, it can be important to consider the vehicle speed for the weight factor. In one embodiment, the weight factor can be described as follows:

$$w(b_i) = \begin{cases} 0 & \text{if } |b_i| < d0 \\ \frac{C1}{|b_i|^{|V|+C2} + C3} & \text{if } d0 \leq |b_i| \leq d1 \\ 0 & \text{if } |b_i| > d1 \end{cases} \quad \text{Eq. (7)}$$

where V is the 3D velocity vector of the vehicle, given as V=(Vx, Vy, Vz), and $|V|$ is a norm value of the velocity vector; C1 is a positive constant while C2 and C3 are non-negative constants, acting as two bias factors.

In an embodiment, when the norm values of the positions of the subset of the points in the point cloud B are (i) equal to or greater than the first threshold and/or (ii) equal to or less than the second threshold, the weight factors of the subset of the points in the point cloud B can be positively related to the norm value of the velocity vector.

For example, in Eq. (7), if $|V|$ is small, the weight factor can behave in a manner that is similar to Eq. (6), i.e., when $|b_i|$ is large, the corresponding weight factor is small. As $|V|$ becomes larger, the weight factor can increase even for points at different distances. As $|V|$ approaches infinity, the weight factor can become a constant, i.e., all points have the same importance. In all the cases, the weight factors for distant points are can be less than those for points that are close and/or at a moderate distance, even though the difference becomes smaller as the vehicle speed $|V|$ becomes larger.

In some embodiments, one or more threshold can be applied to the vehicle speed. For example, when the norm values of the positions of the subset of the points in the point cloud B are (i) equal to or greater than the first threshold and/or (ii) equal to or less than the second threshold, the weight factors of the subset of the points in the point cloud B are determined based on a comparison between the norm value of the velocity vector and a third threshold. In one embodiment, when the vehicle speed is greater than the third threshold, the weight factors for distant points are larger than those for points that are close and/or in moderate distance. When the vehicle speed is less than the third threshold, the weight factors for distant points are smaller than those for points that are close and/or in moderate distance. The formula can be given as follows:

$$w(b_i) = \begin{cases} 0 & \text{if } |b_i| < d0 \\ |b_i|^{C1|V|-C2} + C3 & \text{if } d0 \le |b_i| \le d1 \\ 0 & \text{if } |b_i| > d1 \end{cases} \quad \text{Eq. (8)}$$

where C1 is a positive constant while C2 and C3 are non-negative constants.

Specifically, if $|V|>C2/C1$, the exponent of $|b_i|$ becomes positive, making the weight factors larger for distant points than those for points that are close or in moderate distance. If $|V|=C2/C1$, the weight factors can be the same for all points. If $|V|<C2/C1$, the weight factor can behave in a similar manner as Eq. (7).

In some embodiments, the weight factor depends not only on the vehicle speed value but also on a direction of the vehicle velocity. In one embodiment, when the norm values of the positions of the subset of the points in the point cloud B are (i) equal to or greater than the first threshold and/or (ii) equal to or less than the second threshold, the weight factors of the subset of the points in the point cloud B are positively related to a norm value of the velocity vector in one direction. One example of such weight factor can be extended from Eq. (7) as follows:

$$w(b_i) = \begin{cases} 0 & \text{if } |b_i| < d0 \\ \dfrac{1}{|b_x|^{\frac{C1}{|V_x|+C2}} + C3} + \dfrac{1}{|b_y|^{\frac{C4}{|V_y|+C5}} + C6} + \dfrac{1}{|b_z|^{\frac{C7}{|V_z|+C8}} + C9} & \text{if } d0 \le |b_i| \le d1 \\ 0 & \text{if } |b_i| > d1 \end{cases} \quad \text{Eq. (9)}$$

where C1, C4, and C7 are positive constants while C2, C3, C5, C6, C8, and C9 are non-negative biases.

In some embodiments, when the norm values of the positions of the subset of the points in the point cloud B are (i) equal to or greater than the first threshold and/or (ii) equal to or less than the second threshold, the weight factors of the subset of the points in the point cloud B are determined based on a comparison between the norm value of the velocity vector in the one direction and a fourth threshold. In one embodiment, when the norm value of the velocity vector in the one direction is greater than the fourth threshold, the weight factors for distant points are larger than those for points that are closer and/or at moderate distances. When the norm value of the velocity vector in the one direction is less than the fourth threshold, the weight factors for distant points are smaller than those for points that are close and/or at moderate distances. Eq. (8) can be extended to include the effect of the direction of vehicle velocity as follows:

$$w(b_i) = \begin{cases} 0 & \text{if } |b_i| < d0 \\ |b_x|^{C1|V_x|-C2} + |b_y|^{C3|V_{yx}|-C4} + |b_z|^{C5|V_z|-C6} + C7 & \text{if } d0 \le |b_i| \le d1 \\ 0 & \text{if } |b_i| > d1 \end{cases} \quad \text{Eq. (10)}$$

where C1, C3, and C5 are positive constants while C2, C4, C6, and C7 are non-negative constants.

For example, if $|V_x|>C2/C1$, the exponent of $|b_x|$ becomes positive, making the weight factors larger for distant points than those for points that are closer or at moderate distances.

It is noted that, although some exemplary quality metrics presented in this disclosure utilize vehicle velocity to measure the quality of point cloud processing including point cloud compression, other exemplary quality metrics based on this disclosure are also applicable. Further, while certain distance thresholds/ranges have been described, it is noted that the ranges and/or distance thresholds can be used individually or in different combinations in other embodiments. Additionally, different methods for calculating weights can be used for different distance ranges in some embodiments

IV. Flowchart

Figure 10:
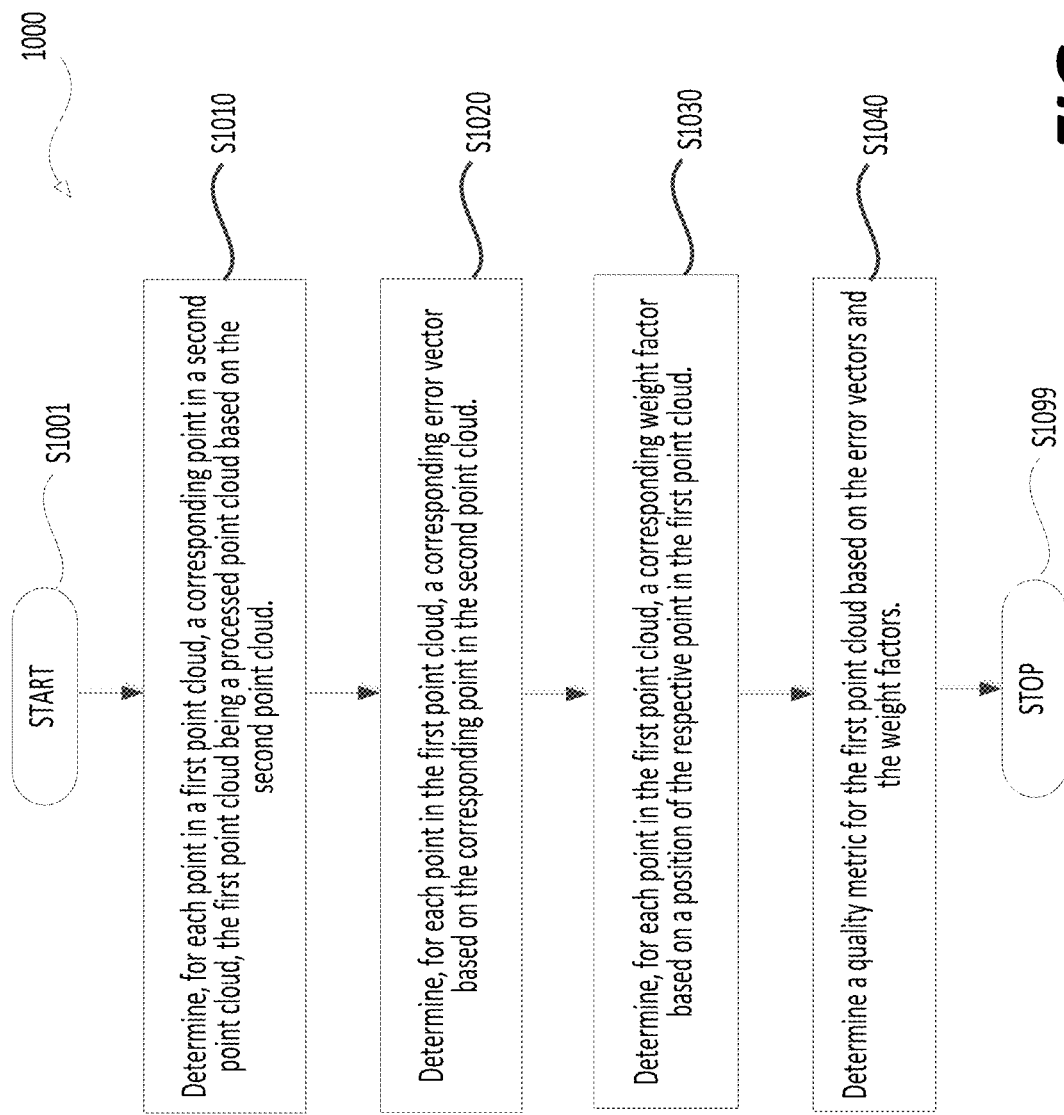
FIG. 10 shows a flow chart outlining a process example in accordance with some embodiments.

FIG. 10 shows a flow chart outlining a process (1000) according to an embodiment of the disclosure. The process (1000) can be used during an encoding process for encoding point clouds. In various embodiments, the process (1000) is executed by processing circuitry, such as the processing circuitry in the terminal devices (110), the processing circuitry that performs functions of the encoder (203) and/or the decoder (201), the processing circuitry that performs functions of the encoder (300), the decoder (400), the encoder (700), and/or the decoder (800), and the like. In some embodiments, the process (1000) is implemented in software instructions, thus when the processing circuitry executes the software instructions, the processing circuitry performs the process (1000). The process starts at (S1001) and proceeds to (S1010).

At (S1010), the process (1000) determines, for each point in a first point cloud, a corresponding point in a second point cloud. The first point cloud is a processed point cloud based on the second point cloud. Then, the process (1000) proceeds to step (S1020).

At (S1020), the process (1000) determines, for each point in the first point cloud, a corresponding error vector based on the corresponding point in the second point cloud. Then, the process (1000) proceeds to step (S1030).

At (S1030), the process (1000) determines, for each point in the first point cloud, a corresponding weight factor. For example, the corresponding weight factor can be determined based on a position of the respective point in the first point cloud. Then, the process (1000) proceeds to step (S1040).

At (S1040), the process (1000) determines a quality metric for the first point cloud based on the error vectors and the weight factors. Then, the process proceeds to (S1099) and terminates.

According to aspects of the disclosure, the process (1000) determines, for each point in the first point cloud, the corresponding weight factor based on a velocity vector and the position of the respective point in the first point cloud.

In an embodiment, the process (1000) determines, for each point in the first point cloud, the corresponding weight factor of the respective point in the first point cloud as zero based on a norm value of the position of the respective point in the first point cloud being (i) less than a first threshold or (ii) greater than a second threshold.

In an embodiment, the process (1000) determines, for each point in the first point cloud, the corresponding weight factor of the respective point in the first point cloud as a positive constant based on the norm value of the position of the respective point in the first point cloud being (i) equal to or greater than a first threshold and (ii) equal to or less than a second threshold.

In an embodiment, norm values of positions of a subset of the points in the first point cloud are (i) equal to or greater than a first threshold and (ii) equal to or less than a second threshold, and the corresponding weight factors of the subset of the points in the first point cloud are inversely related to the norm values of the positions of the subset of the points in the first point cloud.

In an embodiment, norm values of positions of a subset of the points in the first point cloud are (i) equal to or greater than a first threshold and (ii) equal to or less than a second threshold, and the corresponding weight factors of the subset of the points in the first point cloud are positively related to a norm value of the velocity vector.

In an embodiment, norm values of positions of a subset of the points in the first point cloud are (i) equal to or greater than a first threshold and (ii) equal to or less than a second threshold, and the corresponding weight factors of the subset of the points in the first point cloud are determined based on a comparison between a norm value of the velocity vector and a third threshold.

In an embodiment, norm values of positions of a subset of the points in the first point cloud are (i) equal to or greater than a first threshold and (ii) equal to or less than a second threshold, and the corresponding weight factors of the subset of the points in the first point cloud are positively related to a norm value of the velocity vector in one direction.

In an embodiment, norm values of positions of a subset of the points in the first point cloud are (i) equal to or greater than a first threshold and (ii) equal to or less than a second threshold, and the corresponding weight factors of the subset of the points in the first point cloud are determined based on a comparison between a norm value of the velocity vector in one direction and a fourth threshold.

In an embodiment, both the first point cloud and the second point cloud use a same coordinate system, and the process (1000) determines, for each point in the first point cloud, the corresponding point in the second point cloud to be a point in the second point cloud that is nearest to the respective point in the first point cloud.

V. Computer System

The techniques described above, can be implemented as computer software using computer-readable instructions and physically stored in one or more computer-readable media. For example, FIG. 11 shows a computer system (1100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
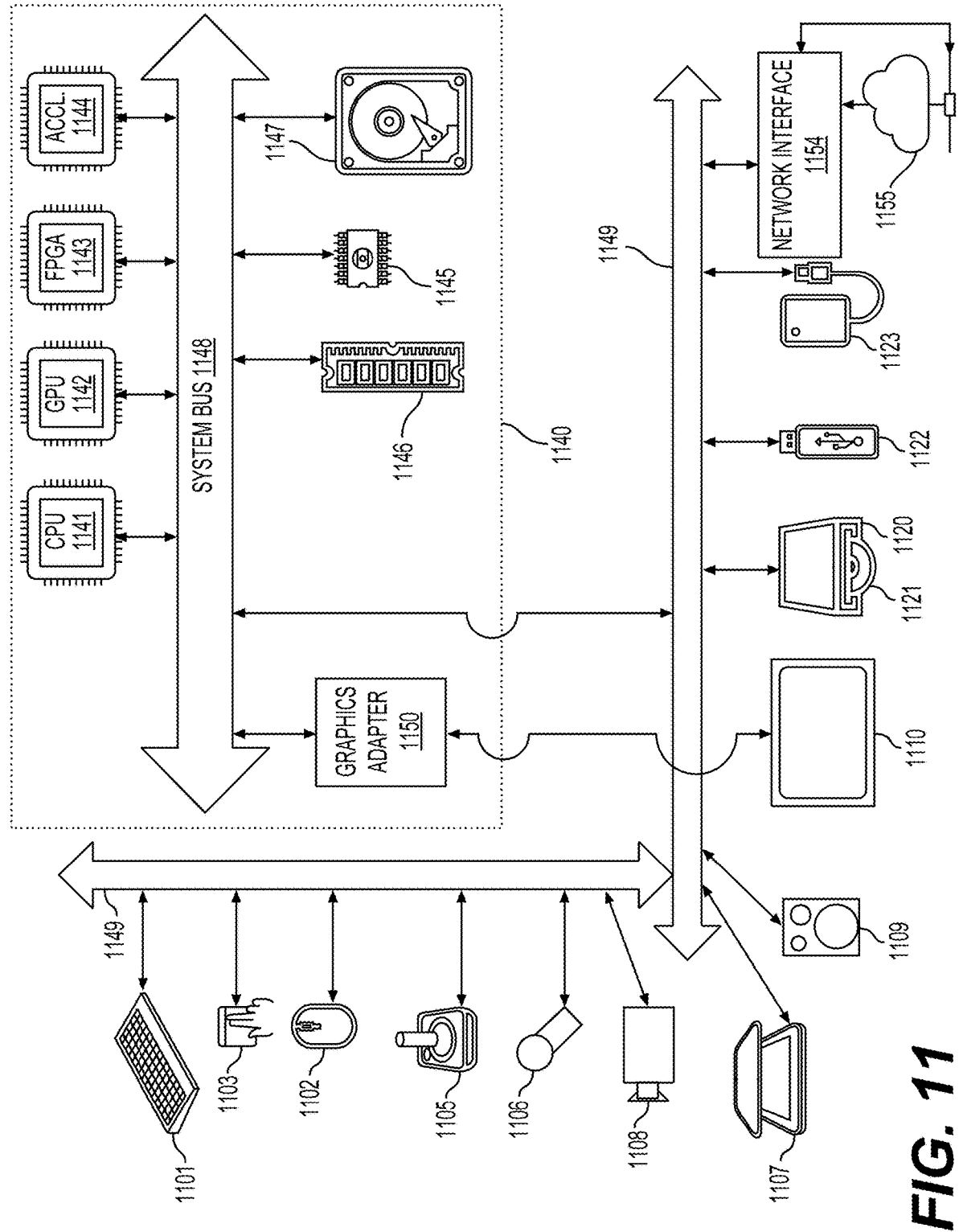
FIG. 11 is a schematic illustration of a computer system in accordance with an embodiment.

The components shown in FIG. 11 for computer system (1100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1100).

Computer system (1100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1101), mouse (1102), trackpad (1103), touch screen (1110), data-glove (not shown), joystick (1105), microphone (1106), scanner (1107), camera (1108).

Computer system (1100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1110), data-glove (not shown), or joystick (1105), but there can also be tactile feedback devices that do not serve as input devices), audio output devices (such as: speakers (1109), headphones (not depicted)), visual output devices (such as screens (1110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). These visual output devices (such as screens (1110)) can be connected to a system bus (1148) through a graphics adapter (1150).

Computer system (1100) can also include human accessible storage devices and their associated media such as optical media including CD/DVD ROM/RW (1120) with CD/DVD or the like media (1121), thumb-drive (1122), removable hard drive or solid state drive (1123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1100) can also include a network interface (1154) to one or more communication networks (1155). The one or more communication networks (1155) can for example be wireless, wireline, optical. The one or more communication networks (1155) can further be local, wide-area, metropolitan, vehicular and industrial, real-time, delay-tolerant, and so on. Examples of the one or more communication networks (1155) include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1149) (such as, for example USB ports of the computer system (1100)); others are commonly integrated into the core of the computer system (1100) by attachment to a system bus as described below (for example Ethernet interface into a PC computer system or cellular network interface into a smartphone computer system). Using any of these networks, computer system (1100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1140) of the computer system (1100).

The core (1140) can include one or more Central Processing Units (CPU) (1141), Graphics Processing Units (GPU) (1142), specialized programmable processing units in the form of Field Programmable Gate Areas (FPGA) (1143), hardware accelerators for certain tasks (1144), and so forth. These devices, along with Read-only memory (ROM) (1145), Random-access memory (1146), internal mass storage such as internal non-user accessible hard drives, SSDs, and the like (1147), may be connected through the system bus (1148). In some computer systems, the system bus (1148) can be accessible in the form of one or more physical plugs to enable extensions by additional CPUs, GPU, and the like. The peripheral devices can be attached either directly to the core's system bus (1148), or through a peripheral bus (1149). Architectures for a peripheral bus include PCI, USB, and the like.

CPUs (1141), GPUs (1142), FPGAs (1143), and accelerators (1144) can execute certain instructions that, in combination, can make up the aforementioned computer code. That computer code can be stored in ROM (1145) or RAM (1146). Transitional data can be also be stored in RAM (1146), whereas permanent data can be stored for example, in the internal mass storage (1147). Fast storage and retrieve to any of the memory devices can be enabled through the use of cache memory, that can be closely associated with one or more CPU (1141), GPU (1142), mass storage (1147), ROM (1145), RAM (1146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1100), and specifically the core (1140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1140) that are of non-transitory nature, such as core-internal mass storage (1147) or ROM (1145). The software implementing various embodiments of the present disclosure can be stored in such devices and executed by core (1140). A computer-readable medium can include one or more memory devices or chips, according to particular needs. The software can cause the core (1140) and specifically the processors therein (including CPU, GPU, FPGA, and the like) to execute particular processes or particular parts of particular processes described herein, including defining data structures stored in RAM (1146) and modifying such data structures according to the processes defined by the software. In addition or as an alternative, the computer system can provide functionality as a result of logic hardwired or otherwise embodied in a circuit (for example: accelerator (1144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for point cloud coding in a decoder, comprising:
   for each of a plurality of points in a first point cloud,
      determining a corresponding point in a second point cloud, the first point cloud being a processed point cloud based on the second point cloud;
      determining a corresponding error vector based on the corresponding point in the second point cloud;
      determining whether a distance of the respective point in the first point cloud from a same reference point is within a predefined distance subrange; and
      in response to a determination that the distance of the respective point in the first point cloud is within the predefined distance subrange, determining a corresponding weight factor of the respective point in the first point cloud as a non-zero number; and
   determining a quality metric for the first point cloud based on squared lengths of the error vectors multiplied by the weight factors.

2. The method of claim 1, wherein the determining the corresponding weight factor comprises:
   determining the corresponding weight factor of the respective point based on a velocity vector and a position of the respective point in the first point cloud.

3. The method of claim 1, further comprising:
   for each of the plurality of points in the first point cloud,
      in response to a determination that the distance of the respective point in the first point cloud is not within the predefined distance subrange, determining the corresponding weight factor of the respective point in the first point cloud as zero.

4. The method of claim 1, wherein the determining the corresponding weight factor comprises:
   determining the corresponding weight factor of the respective point in the first point cloud as a positive constant.

5. The method of claim 1, wherein
norm values of positions of a subset of the points in the first point cloud are (i) equal to or greater than a first threshold and (ii) equal to or less than a second threshold, and
the corresponding weight factors of the subset of the points in the first point cloud are inversely related to the norm values of the positions of the subset of the points in the first point cloud.

6. The method of claim 1, wherein
both the first point cloud and the second point cloud use a same coordinate system, and
the determining the corresponding point in the second point cloud includes determining for each point in the first point cloud, the corresponding point in the second point cloud to be a point in the second point cloud that is nearest to the respective point in the first point cloud.

7. The method of claim 2, wherein
norm values of positions of a subset of the points in the first point cloud are (i) equal to or greater than a first threshold and (ii) equal to or less than a second threshold, and
the corresponding weight factors of the subset of the points in the first point cloud are positively related to a norm value of the velocity vector.

8. The method of claim 2, wherein
norm values of positions of a subset of the points in the first point cloud are (i) equal to or greater than a first threshold and (ii) equal to or less than a second threshold, and
the corresponding weight factors of the subset of the points in the first point cloud are determined based on a comparison between a norm value of the velocity vector and a third threshold.

9. The method of claim 2, wherein
norm values of positions of a subset of the points in the first point cloud are (i) equal to or greater than a first threshold and (ii) equal to or less than a second threshold, and
the corresponding weight factors of the subset of the points in the first point cloud are positively related to a norm value of the velocity vector in one direction.

10. The method of claim 2, wherein
norm values of positions of a subset of the points in the first point cloud are (i) equal to or greater than a first threshold and (ii) equal to or less than a second threshold, and
the corresponding weight factors of the subset of the points in the first point cloud are determined based on a comparison between a norm value of the velocity vector in one direction and a fourth threshold.

11. An apparatus for point cloud coding, comprising processing circuitry configured to:
for each of a plurality of points in a first point cloud,
determine a corresponding point in a second point cloud, the first point cloud being a processed point cloud based on the second point cloud;
determine a corresponding error vector based on the corresponding point in the second point cloud;
determine whether a distance of the respective point in the first point cloud from a same reference point is within a predefined distance subrange; and
in response to a determination that the distance of the respective point in the first point cloud is within the predefined distance subrange, determine a corresponding weight factor of the respective point in the first point cloud as a non-zero number; and
determine a quality metric for the first point cloud based on squared lengths of the error vectors multiplied by the weight factors.

12. The apparatus of claim 11, wherein the processing circuitry is configured to:
in response to the determination that the distance of the respective point is within the predefined distance subrange,
determine the corresponding weight factor based on a velocity vector and a position of the respective point in the first point cloud.

13. The apparatus of claim 11, wherein the processing circuitry is configured to:
for each of the plurality of points in the first point cloud,
in response to a determination that the distance of the respective point in the first point cloud is not within the predefined distance subrange, determine the corresponding weight factor of the respective point in the first point cloud as zero.

14. The apparatus of claim 11, wherein the processing circuitry is configured to:
in response to the determination that the distance of the respective point is within the predefined distance subrange, determine the corresponding weight factor of the respective point in the first point cloud as a positive constant.

15. The apparatus of claim 11, wherein
norm values of positions of a subset of the points in the first point cloud are (i) equal to or greater than a first threshold and (ii) equal to or less than a second threshold, and
the corresponding weight factors of the subset of the points in the first point cloud are inversely related to the norm values of the positions of the subset of the points in the first point cloud.

16. The apparatus of claim 12, wherein
norm values of positions of a subset of the points in the first point cloud are (i) equal to or greater than a first threshold and (ii) equal to or less than a second threshold, and
the corresponding weight factors of the subset of the points in the first point cloud are positively related to a norm value of the velocity vector.

17. The apparatus of claim 12, wherein
norm values of positions of a subset of the points in the first point cloud are (i) equal to or greater than a first threshold and (ii) equal to or less than a second threshold, and
the corresponding weight factors of the subset of the points in the first point cloud are determined based on a comparison between a norm value of the velocity vector and a third threshold.

18. The apparatus of claim 12, wherein
norm values of positions of a subset of the points in the first point cloud are (i) equal to or greater than a first threshold and (ii) equal to or less than a second threshold, and
the corresponding weight factors of the subset of the points in the first point cloud are positively related to a norm value of the velocity vector in one direction.

19. The apparatus of claim 12, wherein
norm values of positions of a subset of the points in the first point cloud are (i) equal to or greater than a first threshold and (ii) equal to or less than a second threshold, and
the corresponding weight factors of the subset of the points in the first point cloud are determined based on a comparison between a norm value of the velocity vector in one direction and a fourth threshold.

20. A non-transitory computer-readable medium storing instructions which when executed by a computer for point cloud coding cause the computer to perform:
for each of a plurality of points in a first point cloud,
determining a corresponding point in a second point cloud, the first point cloud being a processed point cloud based on the second point cloud;
determining a corresponding error vector based on the corresponding point in the second point cloud;
determining whether a distance of the respective point in the first point cloud from a same reference point is within a predefined range distance subrange; and
in response to a determination that the distance of the respective point in the first point cloud is within the predefined distance subrange, determining a corresponding weight factor of the respective point in the first point cloud as a non-zero number; and
determining a quality metric for the first point cloud based on squared lengths of the error vectors multiplied by the weight factors.

\* \* \* \* \*